US006581319B2

United States Patent
West

(10) Patent No.: US 6,581,319 B2
(45) Date of Patent: Jun. 24, 2003

(54) BATTERY POWERED VIBRATING FISHING LURE

(76) Inventor: Daron K. West, 8725 Old Federal Rd., Ballground, GA (US) 30107

( * ) Notice: Subject to any disclaimer, the term of this patent is extended or adjusted under 35 U.S.C. 154(b) by 0 days.

(21) Appl. No.: 09/740,750

(22) Filed: Dec. 19, 2000

(65) Prior Publication Data

US 2002/0073600 A1 Jun. 20, 2002

(51) Int. Cl.$^7$ .......................... A01K 85/00; A01K 85/01
(52) U.S. Cl. .......................... 43/26.2; 43/17.1; 43/42.31
(58) Field of Search ................. 43/17.1, 26.2, 43/42, 42.06, 42.22, 42.31

(56) References Cited

U.S. PATENT DOCUMENTS

| | | | |
|---|---|---|---|
| 2,757,475 A | 8/1956 | Pankove | 43/17.1 |
| 3,310,902 A | 3/1967 | Godby | 43/17.1 |
| 3,728,811 A * | 4/1973 | Weimer | 43/42.12 |
| 3,841,012 A * | 10/1974 | Maled | 43/26.2 |
| 3,940,868 A | 3/1976 | Northcutt | 43/17.6 |
| 4,223,467 A | 9/1980 | Hodges, Jr. et al. | 43/42.31 |
| 4,380,132 A | 4/1983 | Atkinson | 43/26.2 |
| 4,416,080 A * | 11/1983 | Morrissette | 43/42.2 |
| 4,602,451 A * | 7/1986 | Perez et al. | 43/26.1 |
| 4,805,339 A | 2/1989 | Fuentes et al. | 43/42.31 |
| 5,157,857 A | 10/1992 | Livingston | 43/17.6 |
| 5,406,734 A * | 4/1995 | Ho et al. | 43/17.1 |
| 5,485,697 A * | 1/1996 | Watson et al. | 43/42.31 |
| 5,697,182 A * | 12/1997 | Rodgers | 43/17.1 |
| 5,875,582 A * | 3/1999 | Ratzlaff et al. | 43/26.1 |
| 6,035,574 A | 3/2000 | Ware | 43/42.06 |
| 6,047,492 A | 4/2000 | Watson et al. | 43/42.31 |
| 6,050,022 A | 4/2000 | Brick | 43/26.2 |
| 6,057,753 A * | 5/2000 | Myers | 340/407.1 |
| 6,108,962 A * | 8/2000 | Barron | 43/42.31 |
| 6,108,963 A * | 8/2000 | Lucas et al. | 43/42.31 |
| 6,192,617 B1 * | 2/2001 | Lyles | 43/42.06 |

FOREIGN PATENT DOCUMENTS

WO    WO 99/21416    5/1999    .......... A01K/85/00

OTHER PUBLICATIONS

Frasure, L. Besides A Vortex Plant at Kalispell and the 30–Mile Length of Flathead Lake, This Corner of Montana Boasts the Large Lake Trout, Mackinaw, *Lewiston Morning Tribune*, Sep. 27, 1990, p. 2D, News Section.

* cited by examiner

*Primary Examiner*—Charles T Jordan
*Assistant Examiner*—Tara M. Golba
(74) *Attorney, Agent, or Firm*—Merchant & Gould

(57) ABSTRACT

A fishing lure that emanates an intermittent sound-producing vibration for attracting fish. The lure comprises a body which simulates a living creature, where a central portion thereof includes a motor mounting an unbalanced weighted shaft to effect the vibration. Further, the motor is controlled by a programmed microprocessor to randomly operate the motor.

20 Claims, 1 Drawing Sheet

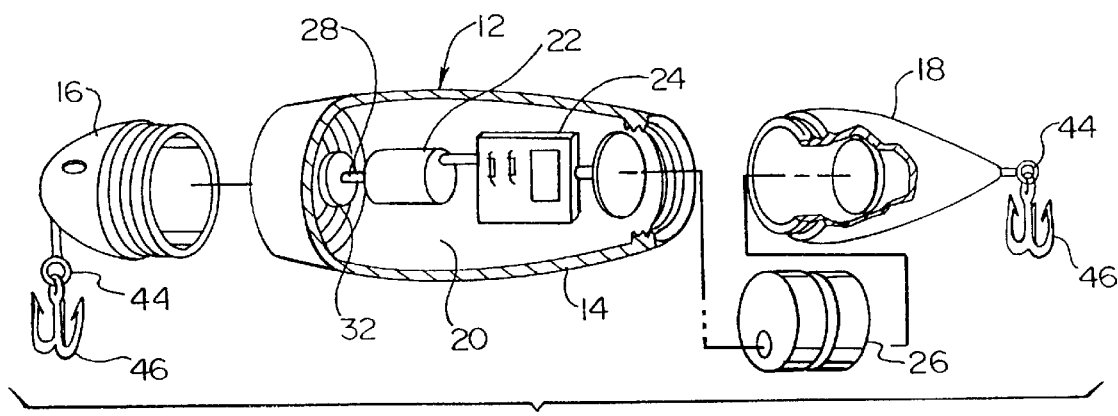
*Fig. 1*
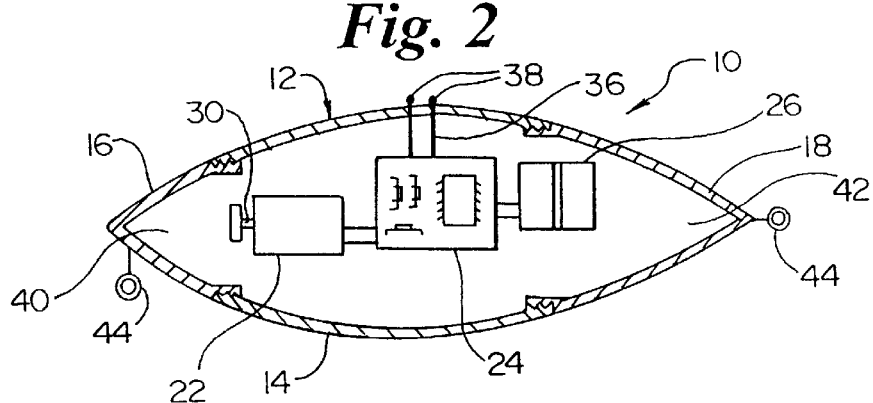
*Fig. 2*
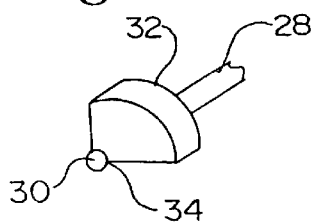    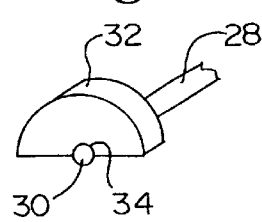    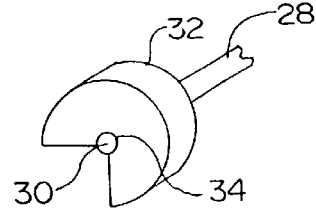
*Fig. 3*            *Fig. 4*            *Fig. 5*

BATTERY POWERED VIBRATING FISHING LURE

FIELD OF THE INVENTION

This invention is directed to the field of fishing lures, more particularly to a battery powered vibrating fishing lure to simulate an active and live bait.

BACKGROUND OF THE INVENTION

The present invention relates to a unique fishing lure of the type to simulate live fish bait to attract fish to be caught. The purpose of any fishing lure is to attract a fish by mimicking a creature which is a part of the normal diet of the fish, such as a worm, amphibian, or smaller fish. Among the expedients taught by the prior art are arrangements for producing sounds and vibrations. For example, U.S. Pat. No. 2,552,730, to Miller, provides a leaf spring which vibrates when the fishing line is given a sudden jerk. Since the spring vibrates in the water, however, the vibrations are of only short duration and thus effective only if a fish is in the immediate vicinity of the lure at the instant the spring is put in motion. U.S. Pat. No. 2,909,863, to Rector et al., discloses a lure which produces a knocking or tapping sound, by means of a weight string the walls of the hollow interior of the lure. The action of this lure depends upon movement of the lure through the water, and, consequently, results in an erratic tapping rather than uniform vibrations. A piezoelectric transducer powered by a transistorized oscillator circuit is utilized in the lure shown in U.S. Pat. No. 2,757,475, to Pankove.

Further, plug-type lures having internal eccentric, vibrating or buzzing means for producing noise and lure vibration are known in the art. Typical of these lures is the Eccentric Motion Fishing Lure described in U.S. Pat. No. 3,841,012, to Maled, which includes a lure characterized by a hollow body which is caused to vibrate by a rotor, motor and battery combination located inside the body cavity. The battery is wired to the motor and drives an eccentrically mounted weight on the motor output shaft, which weight rotates and strikes the inside cavity of the body to produce vibration, motion, and sound. Another similar lure of the plug design is the Sonic Fishing Lure described in U.S. Pat. No. 3,310,902, to Godby, which lure includes a vibrating coil and breaker point system which are energized by a battery and activated by a switch means operated by tension applied to the connecting line. Buzzing or vibrating of the internal coil and breaker point system is accomplished by pulling or jerking the line to slidably displace the switch with respect to the lure body, and thus complete the electrical circuit.

More recent developments for vibrating lures are described in the further U.S. Patents, namely:

a.) U.S. Pat. No. 4,223,467, to Hodges, Jr. et al., teaches a vibrating fishing lure which includes a hollow body carrying at least one set of hooks and a coil and breaker point vibrator combination mounted in the hollow interior of the body. The vibrator is activated by an attitude sensitive switch and is powered by a battery. The battery is removably positioned in a cylindrically shaped carrier and sleeve located inside the hollow body with access to the battery provided by a water tight threaded cap.

b.) U.S. Pat. No. 4,380,132, to Atkinson, discloses a fishing lure having a water-tight cavity with a wire spring within the cavity, one end of the spring being rigidly affixed to the lure body and the opposite end carrying a weight. The relationship between the cavity size and the weighted spring is such that the spring will oscillate freely within the cavity without the weight striking the cavity walls during normal movement of the lure through the water. Alternate forms of the invention utilize an electronic oscillator driven transducer to produce vibration of the lure body.

c.) U.S. Pat. No. 4,805,339, to Fuentes et al., relates to a sonic fishing lure having an energy source, an electrical circuit, and a sonic transducer, where are each respectively contained within chambers of a generally hollow cylindrically-shaped fishing lure. Due to the construction of the fishing lure, the sound output from the fishing lure is of a greater intensity and is produced for a longer period of time than that of prior art devices. The sound output from a coil activator vibrating plate type of transducer is enhanced by the addition of a second vibrating plate. A fluid connection between the outer surface of the sound transducer and the body of the fishing lure further enhances and intensifies the sound output by the fishing lure.

d.) U.S. Pat. No. 6,035,574, to Ware, teaches a fishing lure for producing vibrations of a pre-determined frequency to attract fish. The fishing lure is provided with a streamlined body to substantially eliminate sound generating turbulence as the fishing lure is pulled through the water. The body is also provided with a shaft passing through the body to cause water passing through the shaft to generate vibrations of a pre-determined frequency known to attract fish. A hook is securely fastened to the body to reduce excess noise otherwise associated with the hook contacting the body.

e.) U.S. Pat. No. 6,047,492, to Watson et al., discloses a fishing lure having a battery-powered oscillator circuit positioned within a water-resistant container module that is removably inserted into a selected body module. The module is balanced to insure proper lure action even as fish-attracting sounds and motions are generated from the container module.

From the foregoing discussion it is clear that there have been many attempts at providing the ideal fishing lure for the many fishermen looking for the best means for attracting a fish. While the above prior art present a variety of such means, none offer the combination of features found in the present fishing lure. Such combination includes a system that vibrates at a pre-set frequency, a "brain" that allows the lure to turn off and on as it moves through the water, and thus operate randomly, vibrates without reeling in by the fisherman, includes a replaceable battery mechanism, offers controlled vibration, and can be weighted to provide nearly neutral buoyancy. The manner by which the present invention brings together all these features will become more apparent in the description which follows, particularly when read in conjunction with the accompanying drawings.

SUMMARY OF THE INVENTION

This invention is directed to a fishing lure that emanates an intermittent sound-producing vibration for attracting fish in water. The fishing lure comprises a dynamically shaped body to simulate a living body, such as fish, worms, bugs and the like, where the dynamically shaped body consists of a central housing portion, and first and second end portions threadably engaging opposing ends of the housing portion. Within the central housing portion is a D.C. motor mounting an unbalanced weighted shaft to effect a vibration of the fishing lure. The shaft mounts an arcuate shaped weight, where the radial arc thereof varies between 90 and 270 degrees. The motor is powered by a battery, preferably rechargeable, and in electrical communication with the D.C. motor to effect vibration of the dynamically shaped body. Further, the fishing lure includes a programmed microprocessor operable to effect the intermittent operation of the D.C. motor, and there are means for securing at least one hook to the body.

Accordingly, an object of the invention is a vibrating fishing lure that includes a motor having an unbalanced weighted shaft, and is operable on an intermittent basis.

Another object hereof is the provision of a fishing lure whose buoyancy can be readily controlled to simulate a fish on top of the water or below the surface.

A further object of this invention is its ability to vibrate without having to be drawn through the water by the fisherman.

A still further object hereof is the provision of a preprogrammed microprocessor, i.e. brain, which allows the fisherman to remotely control the time delays and strength of vibration of the fishing lure.

These and other objects of the invention will become more apparent in the further description and drawings.

BRIEF DESCRIPTION OF DRAWINGS

FIG. 1 is an exploded perspective view, with parts removed to reveal internal details, showing the fishing lure of this invention.

FIG. 2 is a sectional view of the assembled fishing lure of FIG. 1.

FIGS. 3 to 5 are perspective views of three eccentric shapes for removably securing weights to the motor shaft to effect selective vibration of the fishing lure hereof.

DETAILED DESCRIPTION OF PREFERRED EMBODIMENT

This invention relates to a fishing lure that emanates a randomly emitting sound-producing vibration to attract fish in the water. The lure may be shaped to simulate a variety of living creatures, such as a small fish, worms, amphibians, crawdads, bugs and the like, where a preferred embodiment is that of a small fish. The fishing lure will now be described with regard to the several Figures, where like reference numerals represent like components or features throughout the various views.

FIGS. 1 and 2 illustrate an exemplary fishing lure 10 according to the present invention. The fishing lure 10 comprises a body 12 to simulate one of the types of living creatures noted above, and includes a hollow, central body portion 14, and a pair of hollow end portions 16, 18, threadably engaging in watertight relationship with respective ends of said central body portion 14. Internally disposed within the cavity 20 of said central body portion is a D.C. motor 22 electrically connected to a programmed microprocessor 24, as more clearly defined later, and a battery source 26, such as one or a pair of rechargeable 1.5 to 3 volt lithium or alkaline batteries, as known in the art, preferably disposed in one of said end portions 18.

Extending from said D.C. motor 22 is a rotatable shaft 28 having a free end 30 mounting a weighted and unbalancing element 32 to effect vibration of the lure 10 when the D.C. motor is operable. To ensure the proper degree of vibration, the unbalancing element 32 may assume a variety of shapes, where three exemplary shapes are illustrated in FIGS. 3 to 5. The preferred shapes are arcuate m configuration with a radial extent of about 90° to about 270°, however, it should be understood that this radial extent may vary as desired by the fisherman to maximize or minimize the vibration. FIG. 3 shows a quarter section, i.e. 90°, that may be desired to effect a maximum vibration, such as on a rainy or windy day where greater disturbance or action of the lure is desired. FIG. 4 illustrates a half circle that may be used on calmer days, whereas FIG. 5 shows a three fourth circle that provides minimum vibration, such as in quiet or calm still waters when finesse fishing is the order of the day. In each case, where the respective unbalancing elements 32 are preferably formed of plastic, or the like, the elements 32 include a shaft receiving slot 34 for snap engaging said free end of the rotatable shaft 28. This allows for the easy replacement of the weighted element 32 as the weather and fishing conditions may exist or dictate.

The brains of the fishing lure is the programmable microprocessor 24. microprocessor may take the form of a stable timing circuit, such as a TLC555 Timer circuit, as manufactured by Archer and available from Radio Shack, a division of Tandy Corporation. The preferred timing circuit is a monolithic timing circuit fabricated using the LinCMOS process, where LinCMOS is a trademark for a silicon-gate IC process by Texas Instruments. The timing circuit includes a high-impedance input that is capable of producing accurate time delays and oscillations, and can achieve both monostable and a stable operation. In the preferred latter operation, where the circuit includes a single capacitor and a pair of resistors, once the capacitor is charged, the capacitor releases its stored energy through a PNP transistor that acts as a switch to send direct power from the battery source 26 to the D.C. motor 22. Besides a manual switch operating in association with the PNP transistor, as known in the art, an automatic switching means may be incorporated into the lure 10. Alternatively, an automatic switching mechanism may be incorporated into the fishing lure in the form of a pair of electrodes 36, see FIG. 2, that are exposed externally at leads 38. When the fishing lure is submersed in water, the water completes the eletrical circuit between the respective leads, thus switching the circuit to ON to effect vibration of the fishing lure 10. The programmable microprocessor is operable to effect an automatic, intermittent or timed delay operation of the D.C. motor 22.

Returning to FIGS. 1 and 2, the respective hollow end portions 16, 18 include cavities 40, 42 to which may be added weights, as desired, to control the depth of the fishing lure 10, or buoyancy thereof. For example, no weights may be needed for a top floating lure, or selective weights may be used to control the depth of the lure. Additionally, externally the respective end portions may include eyelets 44 to which hook assemblies 46 may be removably attached.

It is recognized that changes, variations and modifications may be made to the fishing lure of this invention, particularly by those skilled in the art, without departing from the spirit and scope of the invention. Accordingly, no limitation is intended to be imposed on this invention, except as set forth in the accompanying claims.

What is claimed is:

1. A fishing lure that emanates an intermittent sound producing vibration for attracting fish in water, said fishing lure comprising:

a.) a dynamically shaped body to simulate a living body, selected from the group consisting of fish, worms, and bugs, said dynamically shaped body consisting of a central housing portion, and first and second end portions threadedly engaging opposite ends of said housing portion;

b.) a D.C. motor within said central housing and mounting an unbalanced weighted shaft to effect a vibration of said fishing lure;

c.) battery means in fluid sealing relationship therewithin in electrical communication with said D.C. motor for powering said motor to effect vibration of said dynamically shaped body;

d.) a programmed microprocessor operable to effect the intermittent operation of said D.C. motor, said programmed microprocessor comprising a timer circuit coupled to a resistance and capacitance that controls the intermittent operation; and e.) means for securing at least one hook to said body.

2. The fishing lure according to claim 1, wherein said battery means are replaceable and rechargeable.

3. The fishing lure according to claim 1, wherein said weighted shaft is effected by at least one arcuate shaped weight having an arc of less than 360°.

4. The fishing lure according to claim 3, wherein said arcuate shaped weight has a radial arc of about 90°.

5. The fishing lure according to claim 3, wherein said arcuate shaped weight has a radial arc of about 180°.

6. The fishing lure according to claim 3, wherein said arcuate shaped weight has a radial arc of about 270°.

7. The fishing lure according to claim 3, wherein said arcuate shaped weight includes a slot for snap engaging said shaft.

8. The fishing lure according to claim 1, wherein said end portions include accessible cavities for placing weights therein to control depth and buoyancy of said fishing lure.

9. The fishing lure according to claim 8, wherein each said end portion includes means for securing hooks thereto.

10. The fishing lure according to claim 1, wherein said programmed microprocessor is mounted upon a microelectronic chip board operable to control functions of said D.C. motor.

11. The fishing lure according to claim 1, further comprising a transistor coupled to said timer circuit and coupled to said D.C. motor to switch on said D.C. motor in response to an output of said timer circuit.

12. The fishing lure according to claim 10, wherein said dynamically shaped body includes a pair of electrodes communicating between said microelectronic chip board and the exterior of said body, such that when immersed in water a circuit is completed to switch on said D.C. motor.

13. The fishing lure according to claim 10, wherein said dynamically shaped body includes a manually operable ON/OFF switch to place said microelectronic chip board into operation.

14. A vibrating fishing lure, comprising:

a lure body having a cavity;

a hook attached to the lure body;

a DC motor having an eccentrically weighted shaft and being mounted within the cavity of the lure body; and a control circuit comprising a timer circuit coupled to a resistance and capacitance that controls an output of the timer circuit, the timing circuit being disposed within the cavity of the lure body, wherein the control circuit includes a DC power source and is configured to supply intermittent DC voltage from the DC power source to the DC motor to impart intermittent vibrations to the lure body.

15. The vibrating fishing lure of claim 14, wherein the lure body comprises a first end section threadedly engaging a first end of a central section and a second end section threadedly engaging a second end of the central section that is opposite the first end.

16. The vibrating fishing lure of claim 15 wherein the control circuit further comprises a transistor coupled to the output of the timer circuit that turns the transistor on and off to intermittently provide voltage from the DC power source to the DC motor through the transistor.

17. The vibrating fishing lure of claim 16, wherein the control circuit further comprises two electrodes that complete a circuit from the DC power source to the timer circuit upon placement of the lure body in water.

18. The vibrating fishing lure of claim 14, wherein the lure body is shaped to resemble a living creature.

19. A method of vibrating a fishing lure, comprising:

providing a lure body having a cavity and a hook attached to the lure body;

eccentrically weighting a shaft of a DC motor disposed in the lure body; and intermittently providing DC voltage between a DC power source disposed in the lure body and the DC motor by controlling with a resistance and a capacitance an output of a timer circuit coupled to the DC power source to intermittently impart vibrations upon the lure body.

20. The method of claim 19, wherein intermittently providing DC voltage comprises:

timing the DC output from the timer circuit to switch on a transistor; and providing voltage from the DC power source to the DC motor through the transistor when the transistor is switched on.

* * * * *